(12) United States Patent
McIntyre, II et al.

(10) Patent No.: US 10,955,130 B1
(45) Date of Patent: Mar. 23, 2021

(54) EXHAUST POWERED LIQUID EVAPORATOR APPARATUS AND METHOD

(71) Applicant: Marine Turbine Technologies, LLC, Franklin, LA (US)

(72) Inventors: Ted Lee McIntyre, II, New Iberia, LA (US); Nelson Joseph Geoffroy, Erath, LA (US); Sylvester Lopez, Jeanerette, LA (US)

(73) Assignee: Marine Turbine Technologies, LLC, Franklin, LA (US)

( * ) Notice: Subject to any disclaimer, the term of this patent is extended or adjusted under 35 U.S.C. 154(b) by 157 days.

(21) Appl. No.: 16/418,260

(22) Filed: May 21, 2019

(51) Int. Cl.
| | | |
|---|---|---|
| *F22D 5/34* | (2006.01) | |
| *F01K 7/44* | (2006.01) | |
| *F01K 21/00* | (2006.01) | |
| *F01K 23/06* | (2006.01) | |

(52) U.S. Cl.
CPC ............ *F22D 5/34* (2013.01); *F01K 7/44* (2013.01); *F01K 21/005* (2013.01); *F01K 23/06* (2013.01)

(58) Field of Classification Search
CPC ... F22D 5/34; F01K 23/06; F01K 7/44; F01K 21/005
USPC .............................. 60/39.182, 614, 616, 618
See application file for complete search history.

(56) References Cited

U.S. PATENT DOCUMENTS

| | | | |
|---|---|---|---|
| 4,995,460 A | | 2/1991 | Strahan |
| 5,282,355 A | * | 2/1994 | Yamaguchi ........ B01D 53/8631 60/39.182 |
| 5,335,728 A | | 8/1994 | Strahan |
| 6,971,238 B1 | | 12/2005 | Walker |
| 7,523,613 B2 | | 4/2009 | Hildebrandt |
| 8,359,868 B2 | * | 1/2013 | Conchieri ................. F02C 3/34 60/772 |
| 8,613,186 B2 | * | 12/2013 | Koganezawa .......... F02C 3/305 60/39.15 |
| 2006/0144034 A1 | | 7/2006 | Shibata et al. |
| 2011/0162367 A1 | | 7/2011 | Okumura et al. |

(Continued)

FOREIGN PATENT DOCUMENTS

| | | |
|---|---|---|
| CN | 102410056 A | 4/2012 |
| EP | 2920434 A1 | 9/2015 |

(Continued)

OTHER PUBLICATIONS

Evaporative Solutions, "Evaporation for Oil & Gas Industry", http://www.evapor.com/evaporation-oilgas.html, Downloaded Jan. 14, 2019, (1 p).

*Primary Examiner* — Hoang M Nguyen
(74) *Attorney, Agent, or Firm* — Young Basile Hanlon & MacFarlane, P.C.

(57) ABSTRACT

An apparatus for rapidly evaporating liquid includes an exhaust flow channel having opposing openings including an upstream opening and a downstream opening. The channel defines an exhaust path proceeding from the upstream opening through the exhaust flow channel and through the downstream opening. Within the exhaust flow channel, a conduit path includes repeated passes transverse to the exhaust path. Attached to the exhaust flow channel proximate the downstream opening, a spray fixture is coupled to an exit port of the conduit. The spray fixture includes a divider to divide fluid from the exit port into multiple streams and an aimer to direct the multiple streams into the exhaust path.

20 Claims, 11 Drawing Sheets

(56) References Cited

U.S. PATENT DOCUMENTS

2016/0146059 A1* 5/2016 Lauzat ...................... F02C 6/18
                                                                             60/775

FOREIGN PATENT DOCUMENTS

| ES | 2024097 A6 | 2/1992 |
| WO | 2014/077691 A1 | 5/2014 |

* cited by examiner

EXHAUST POWERED LIQUID EVAPORATOR APPARATUS AND METHOD

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The field of endeavor concerns machines and methods for rapidly evaporating wastewater at oil and gas production sites.

2. Description of the Related Art

Gas and oil production sites inherently produce a huge amount of water. Water is naturally contained in seams within the earth, and hydrocarbon production operations unavoidably bring a significant amount of such water to the surface. This effect can be magnified with hydraulic fracturing operations.

This water can pose a number of problems. For example, the water can create large ponds that displace or flood equipment and facilities. This problem is especially acute when the job site real estate is limited. Also, wastewater from wells often contains hydrocarbons or petrochemicals, so it can create an environmental hazard and trigger expensive cleanup costs. Furthermore, due to their hydrocarbon content, waste ponds can be harmful and sometimes deadly to waterfowl that land in such ponds. This effect is magnified in arid regions where waste ponds are particularly attractive to birds.

One longstanding solution has been to pump wastewater into a container and move the container to an off-site storage and handling location. This is costly in terms of labor as well as equipment required to pump and transfer the wastewater. It also requires additional real estate, located off site, in order to store the water. Further costs are incurred to eventually filter or otherwise remediate the wastewater, even if stored off-site.

There have also been various technical approaches to these issues. Some of these approaches aim to evaporate the water, so the remaining salts, hydrocarbons, and petrochemicals can be more easily processed and disposed in solid form. For some applications, the known evaporative approaches might be satisfactory. However, for other users or applications, it is desirable to achieve some improvement in known well site evaporation equipment.

For example, some well site operators want to avoid expensive high pressure pumps, which are often required evaporative equipment. Some operators may not be completely satisfied with the flow rate of known systems. Time is money, as they say, and achieving a faster flow rate would remove the undesirable wastewater more quickly. Some known approaches require electrically driven pumps. However, in off-grid operations there is no available electricity. So, to run an electrically driven pump, personnel would have to purchase, fuel, maintain, and operate expensive diesel generators.

Therefore, a particular problem confronting the present inventors is the need to develop a well site evaporative wastewater removal system with high output and low operating cost.

SUMMARY OF THE INVENTION

One aspect of the disclosure is an apparatus for rapidly evaporating liquid. This apparatus includes an exhaust flow channel having opposing openings including an upstream opening and a downstream opening. The channel defines an exhaust path proceeding from the upstream opening through the exhaust flow channel and through the downstream opening. Within the exhaust flow channel, a conduit path includes repeated passes transverse to the exhaust path. Attached to the exhaust flow channel proximate the downstream opening, a spray fixture is coupled to an exit port of the conduit. The spray fixture includes a divider to divide fluid from the exit port into multiple streams and an aimer to direct the multiple streams into the exhaust path.

Another aspect of the disclosure is a method of rapidly evaporating liquid, comprising heating the liquid in two stages. A first stage passes the liquid through one or more conduits passing in a serpentine pattern through an engine exhaust path. A second stage divides fluid from the conduit into a plurality of streams and aims the streams into the engine exhaust path.

INDEX OF NUMERIC REFERENCES

TABLE 1

Figure 1:
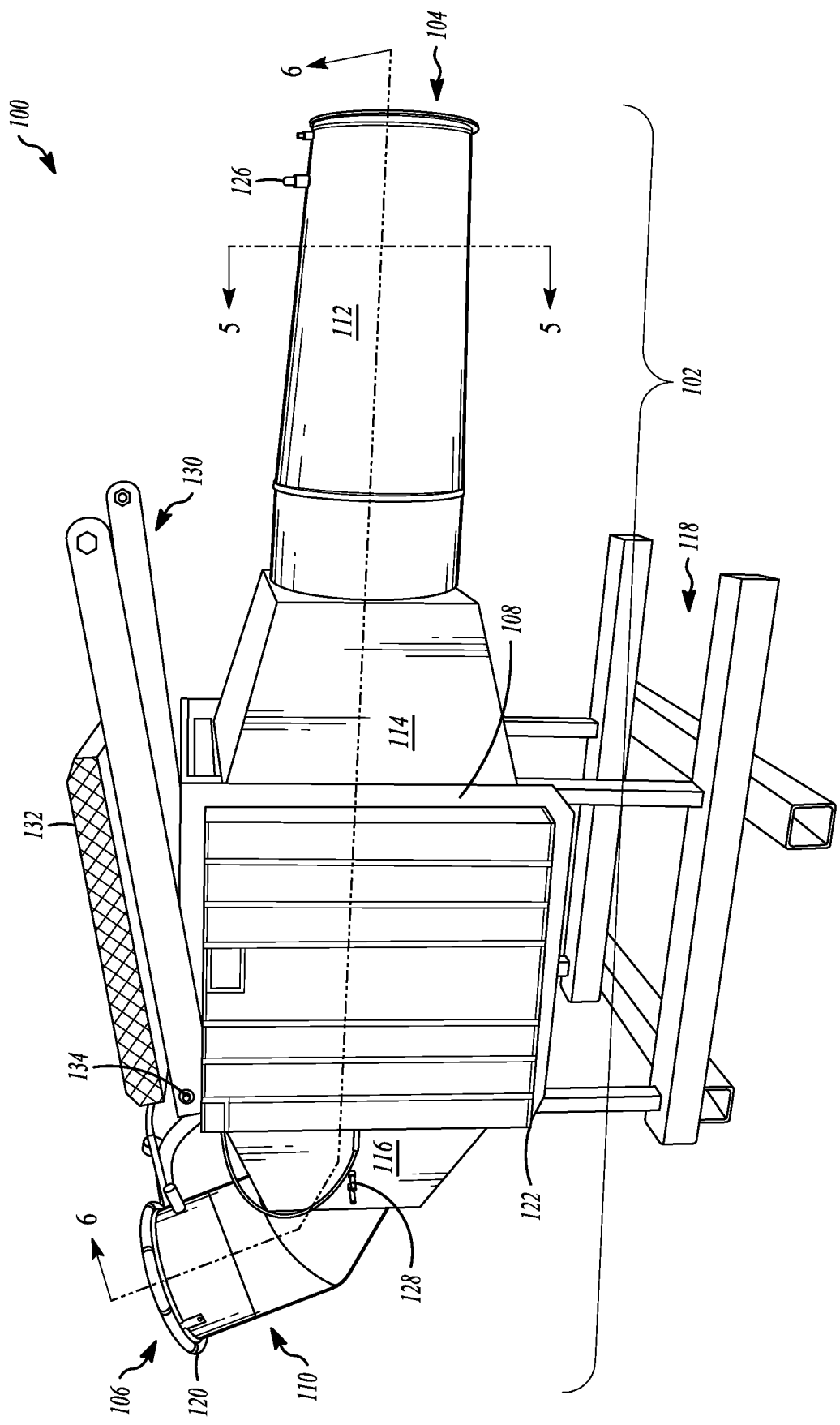
FIG. 1 is first side view of an evaporator.

|  | Reference No. | Name |
| --- | --- | --- |
| FIG 1 | 100 | evaporation system |
|  | 102 | exhaust flow channel |
|  | 104 | intake opening |
|  | 106 | exhaust opening |
|  | 108 | main body |
|  | 110 | throat |
|  | 112 | intake column |
|  | 114 | intake transition |
|  | 116 | exhaust transition |

TABLE 1-continued

Figure 2:
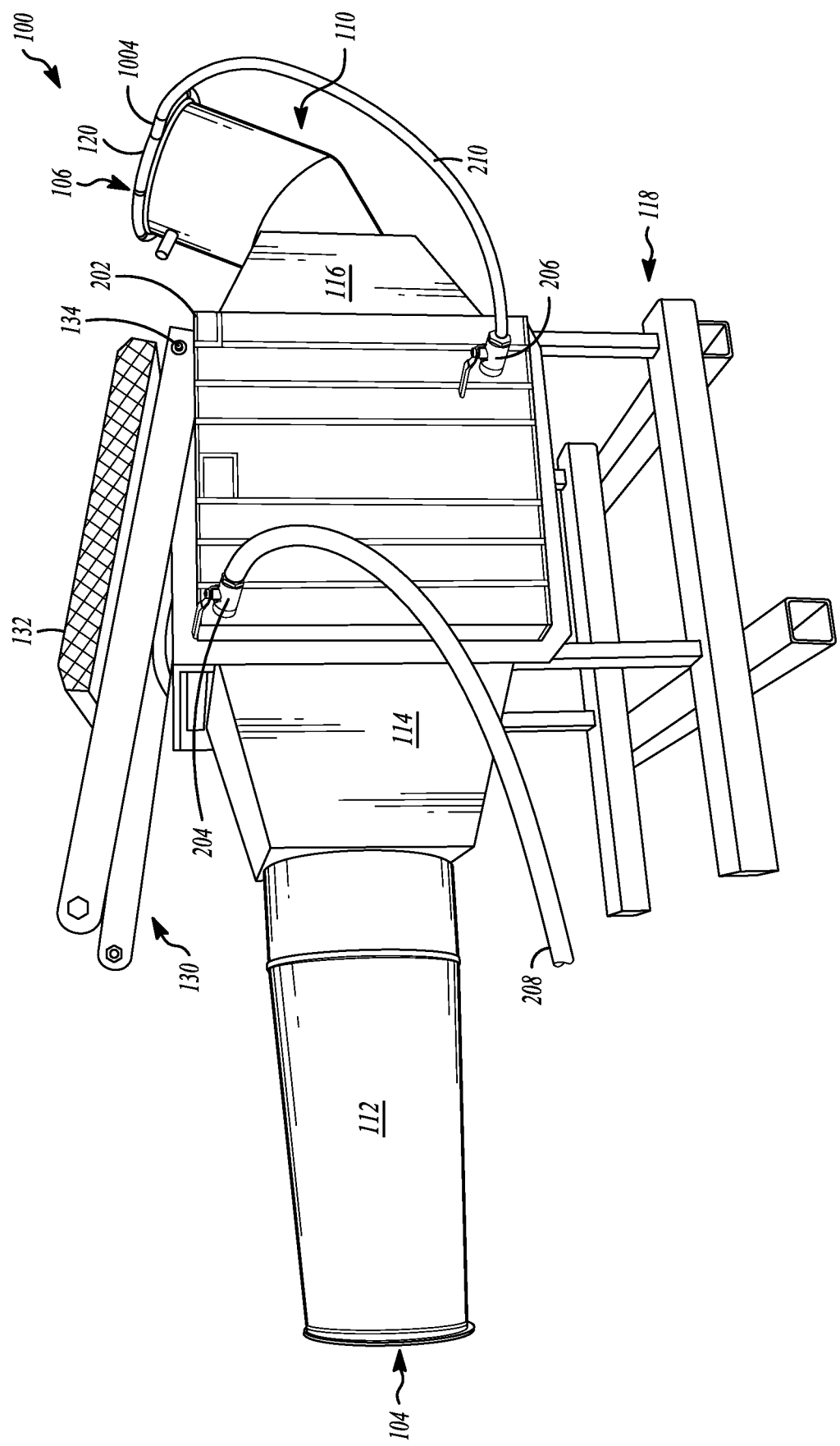
FIG. 2 is a second side view of the apparatus.
Figure 3:
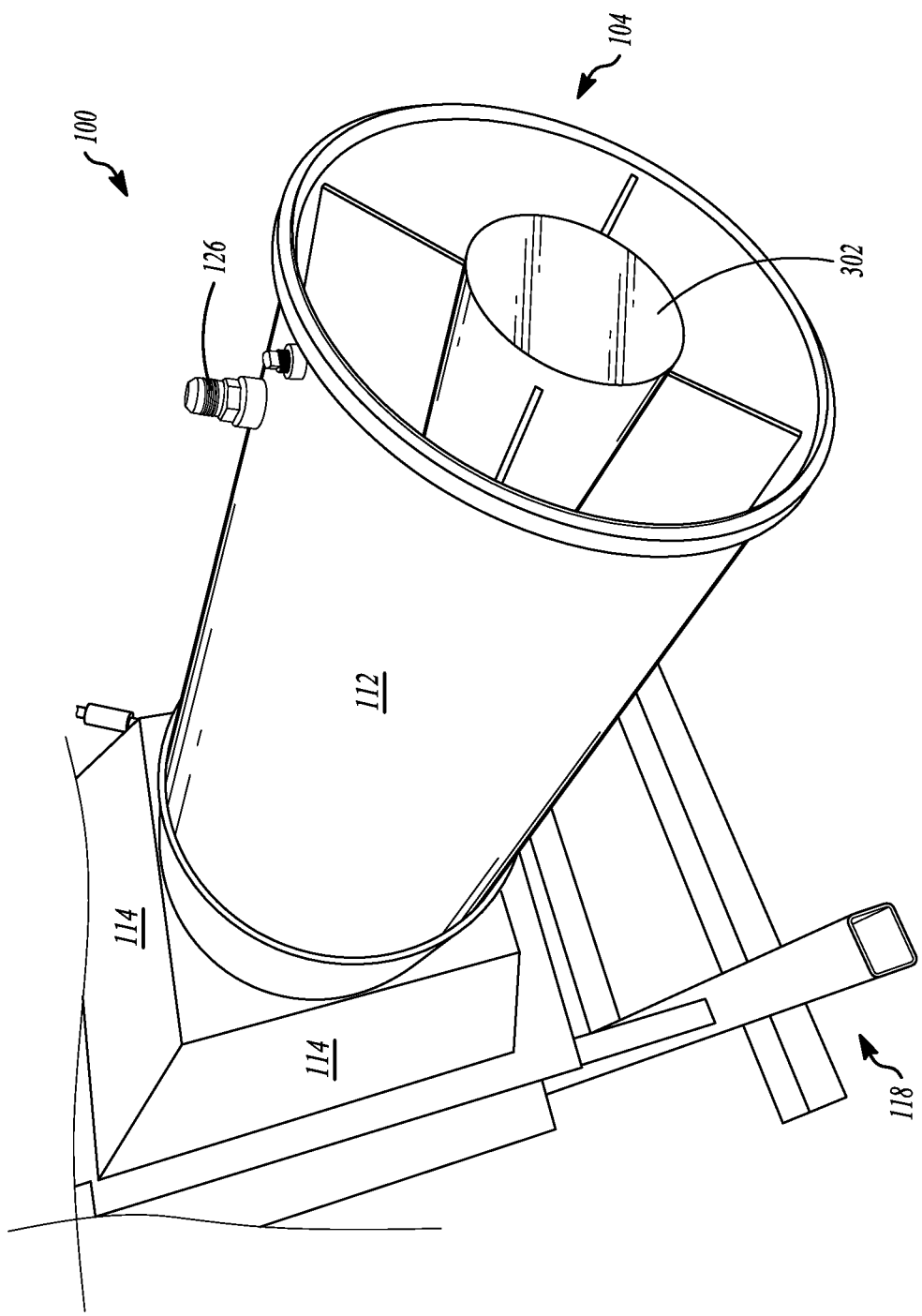
FIG. 3 is a rear partial perspective view of the apparatus.
Figure 4:
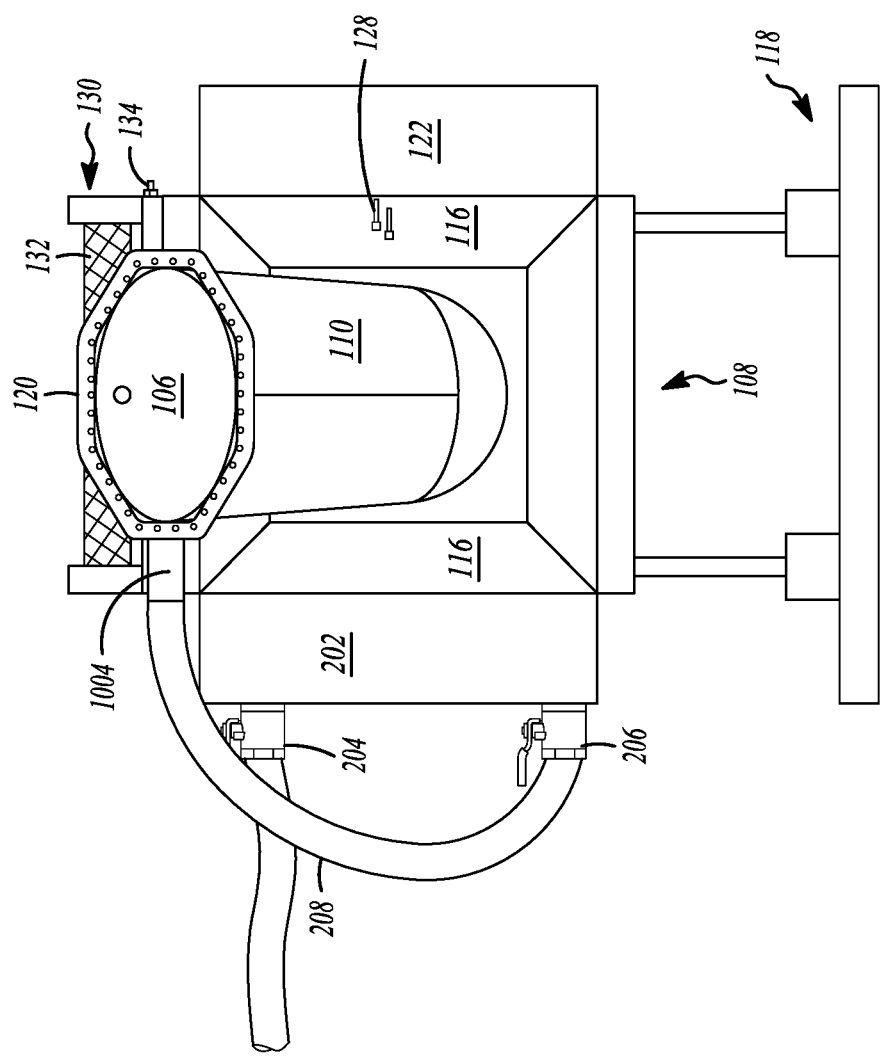
FIG. 4 is a front plan view of the apparatus.
Figure 5:
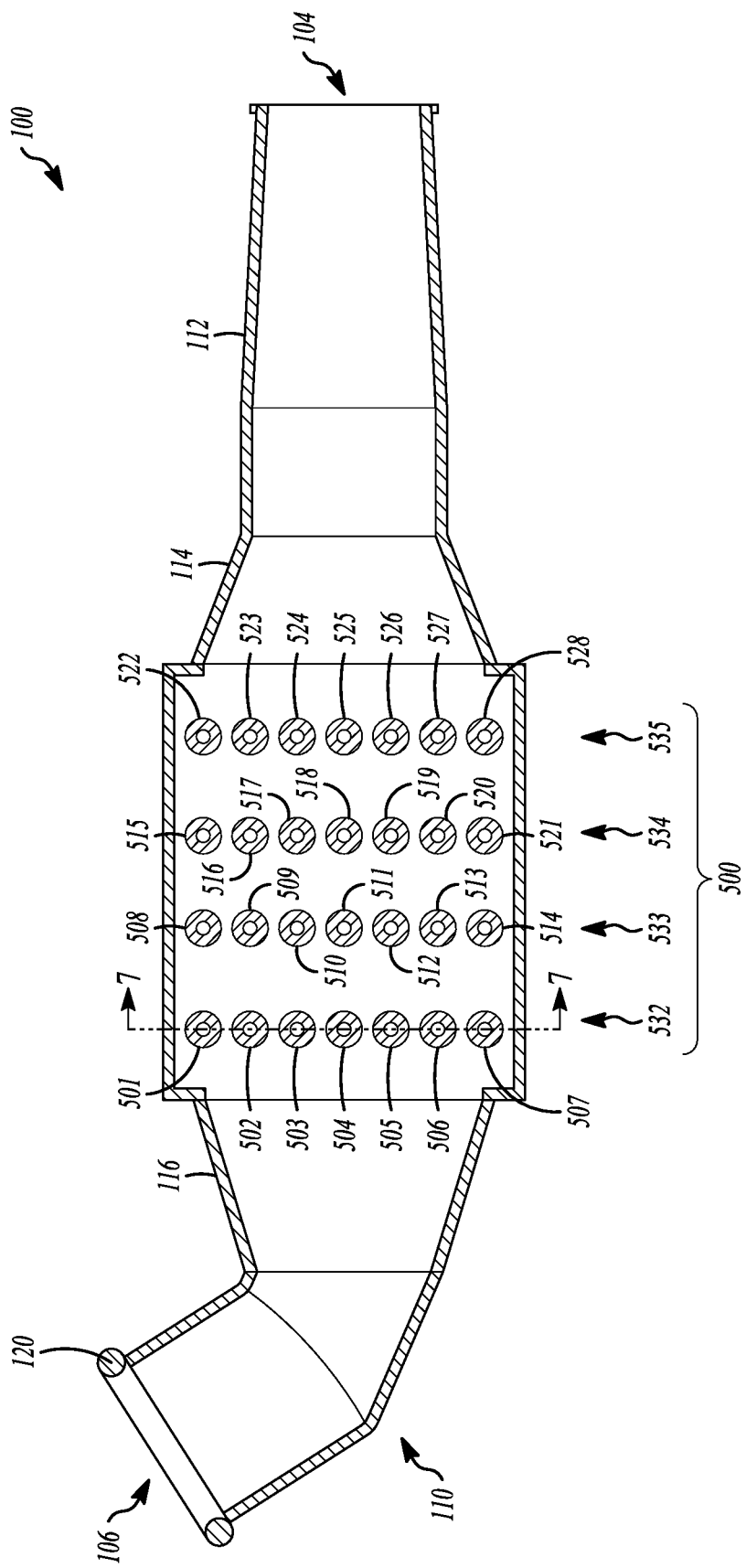
FIG. 5 is a partial cutaway side view of the apparatus, with structure 118 and 130 removed for eased of illustration.
Figure 6:
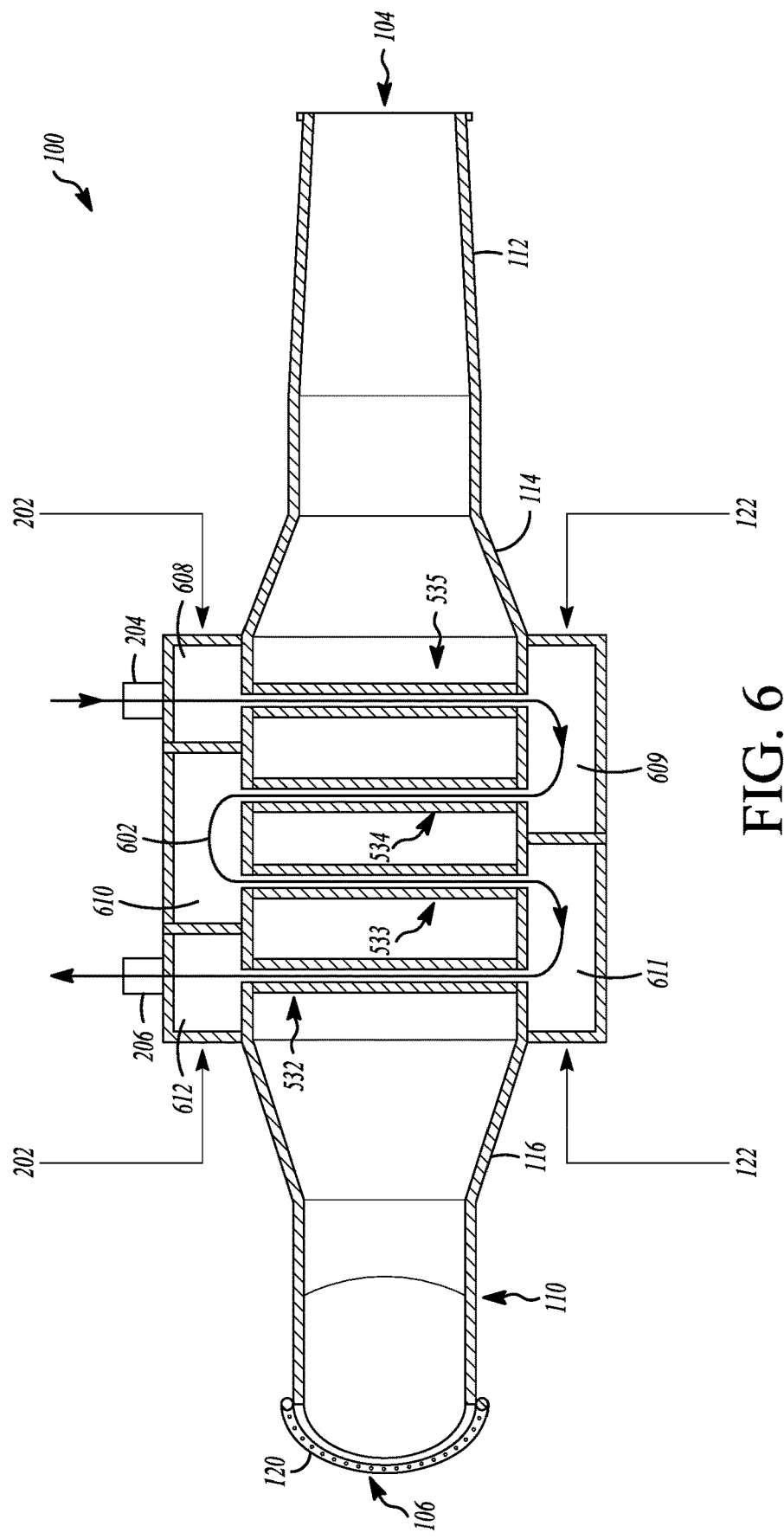
FIG. 6 is a cutaway top view of the apparatus schematically illustrating fluid flow through a conduit path.
Figure 7:
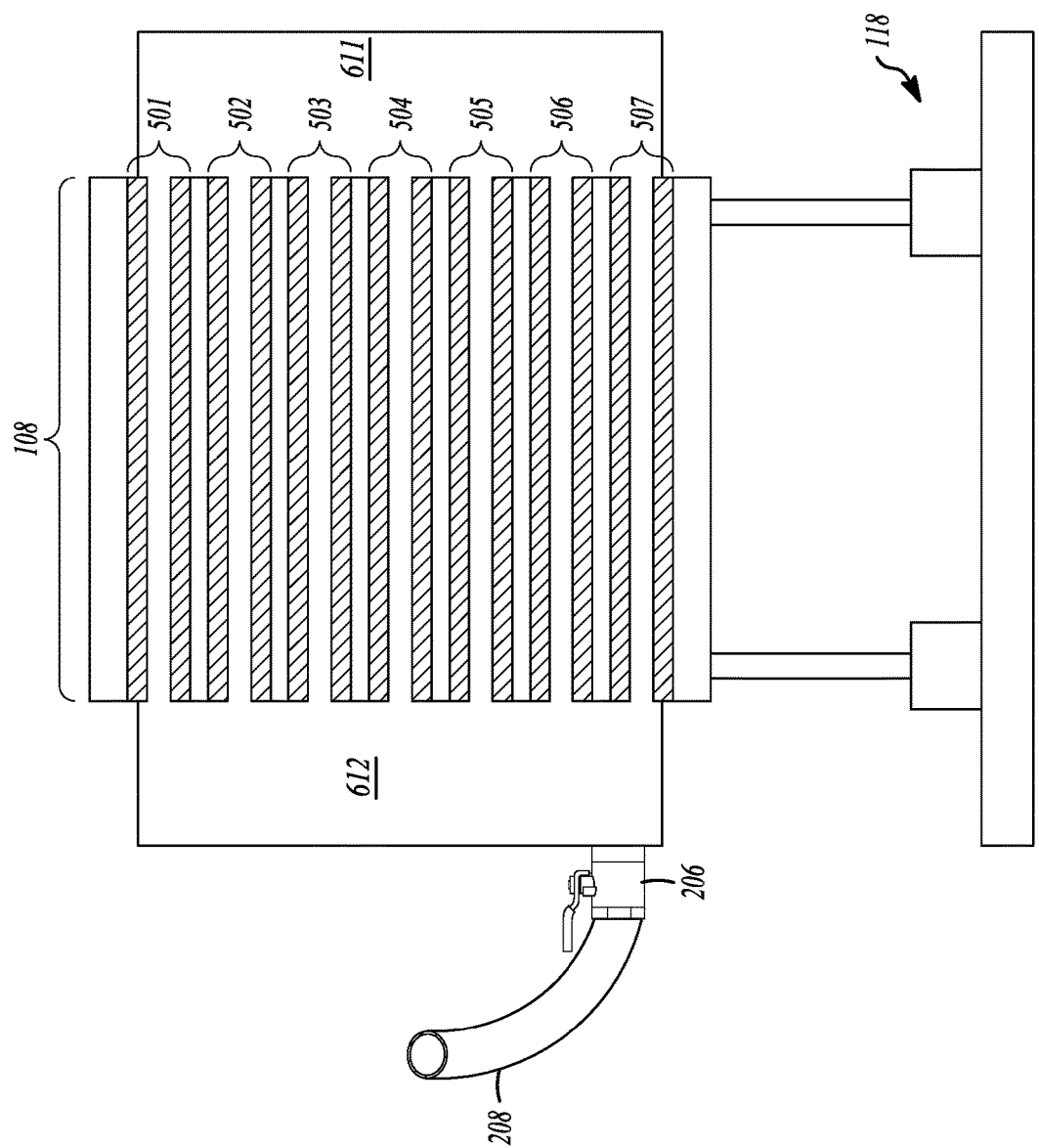
FIG. 7 is a cutaway front view of the apparatus, with structure 130 removed for eased of illustration.
Figure 8:
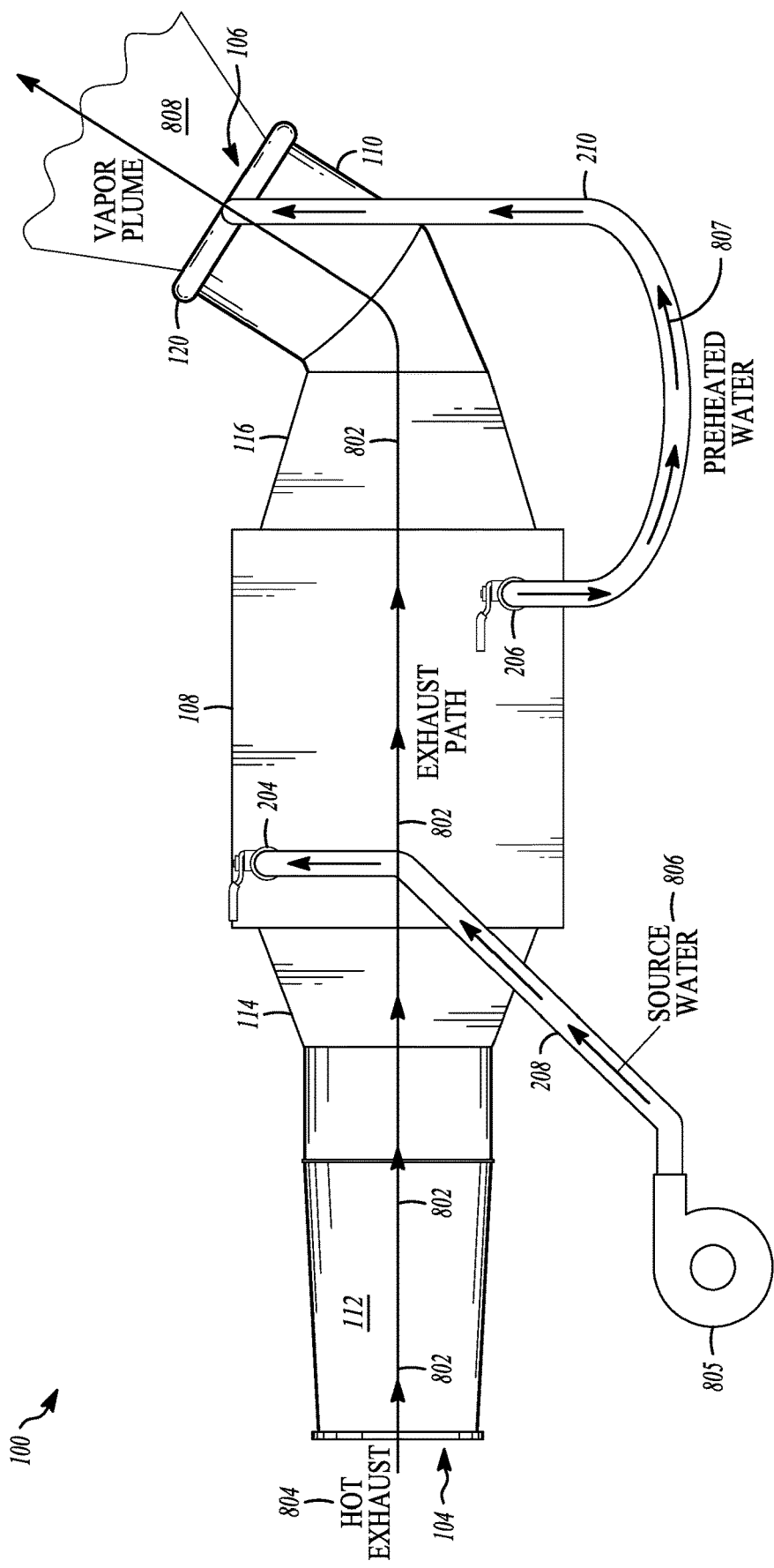
FIG. 8 is a side view of the apparatus, schematically illustrating overall fluid flow, with structure 118 and 130 removed for eased of illustration.
Figure 10:
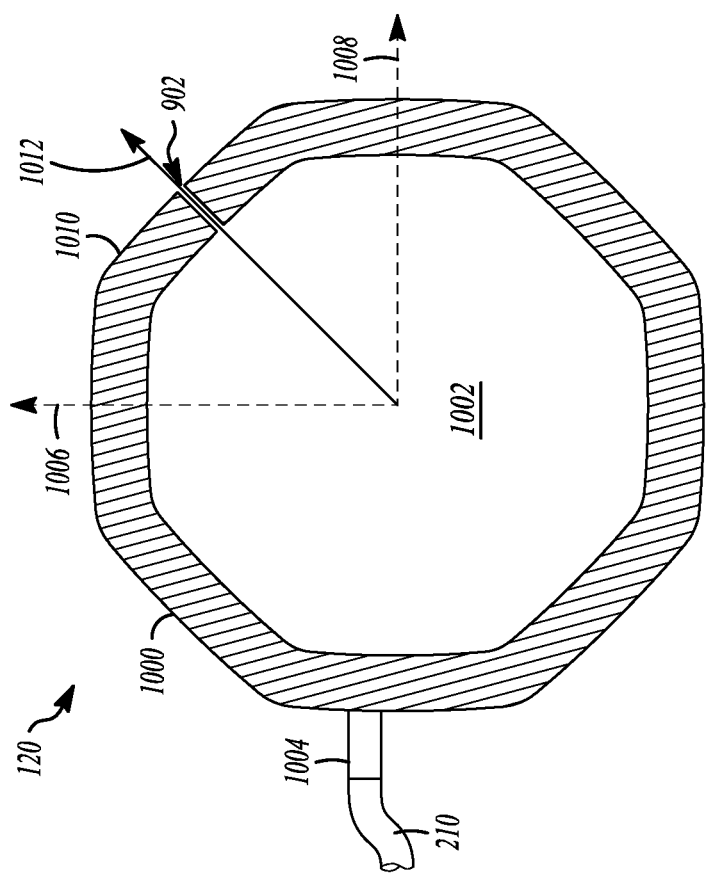
FIG. 10 is a cross sectional view of the spray fixture.
Figure 9:
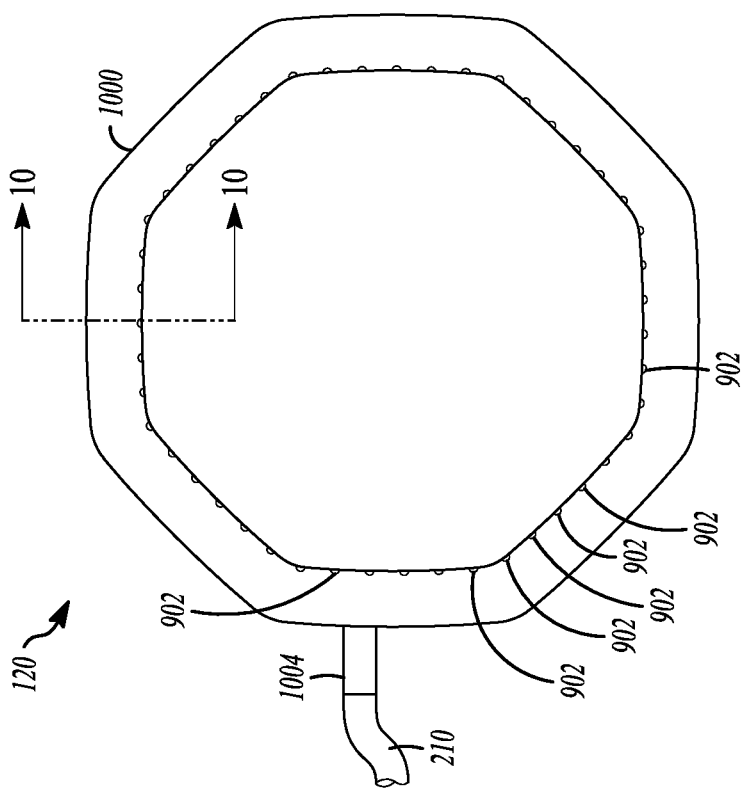
FIG. 9 is a top plan view of a spray fixture.
Figure 11:
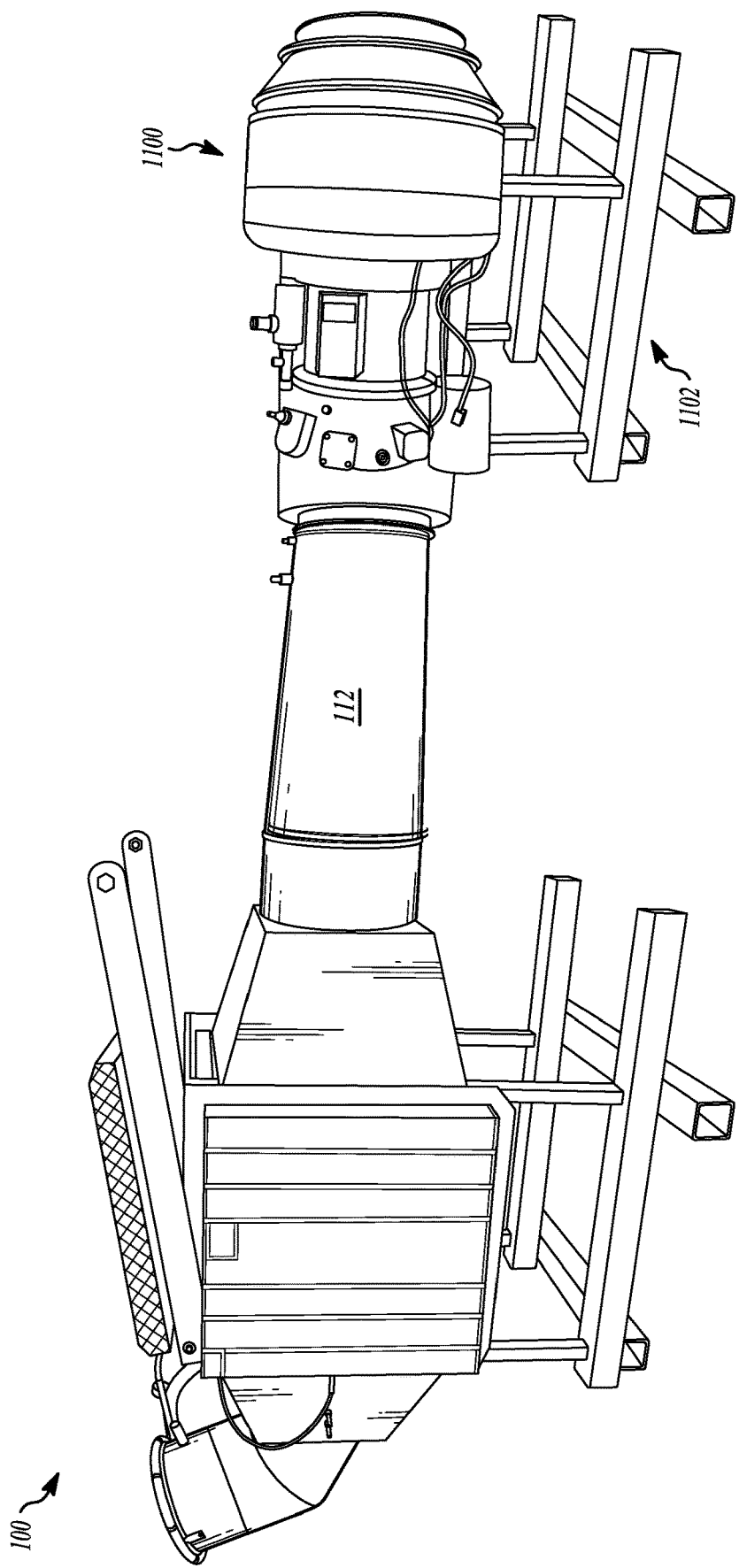
FIG. 11 is a side view of an evaporator with a gas turbine engine.

| | Reference No. | Name |
|---|---|---|
| | 118 | support structure |
| | 120 | spray fixture |
| | 122 | port side plenums |
| | 126 | vent line coupling |
| | 128 | probes |
| FIG 2 | 202 | starboard side plenums |
| | 204 | entry port |
| | 206 | exit port |
| | 208 | hose |
| | 210 | hose |
| FIG 3 | 302 | inverted cone |
| FIG 5 | 500 | conduit |
| | 501-528 | individual pipes |
| | 532 | first set of pipes |
| | 533 | second set of pipes |
| | 534 | third set of pipes |
| | 535 | fourth set of pipes |
| FIG 6 | 602 | heating path |
| | 608 | receiving plenum |
| | 609-611 | redirecting plenums |
| | 512 | discharge plenum |
| FIG 8 | 802 | exhaust path |
| | 804 | hot exhaust |
| | 805 | pump |
| | 806 | source water |
| | 807 | preheated water |
| | 808 | vapor plume |
| FIG 9 | 902 | spray fixture apertures |
| FIG 10 | 1000 | spray fixture wall |
| | 1002 | spray fixture internal volume |
| | 1004 | spray fixture intake coupling |
| | 1006 | upward component |
| | 1008 | inward component |
| | 1010 | inward slope |
| | 1012 | fluid stream |
| FIG 11 | 1100 | gas turbine engine |
| | 1102 | engine support structure |

DETAILED DESCRIPTION

The nature, objectives, and advantages of the invention will become more apparent to those skilled in the art after considering the following detailed description in connection with the accompanying drawings.

Hardware Components and Interconnections

Overall Structure

The present disclosure relates to a system for rapidly evaporating wastewater at oil and/gas production sites. For ease of reference, without any intended limitation, this system may be referred to as an evaporation system or evaporation apparatus. Broadly, this system provides an apparatus for rapidly evaporating liquid, and may even be implemented in settings beyond oil and gas well sites.

FIG. 1 depicts an exemplary system 100, which includes an elongated exhaust flow channel 102 having an intake opening 104 and an opposing exhaust opening 106. In operation, as described in fuller detail below, the intake opening 104 is connected to the exhaust output of an engine such as a gas turbine engine. This installation is illustrated by reference 1100 in FIG. 11 and discussed in greater detail below.

The exhaust flow channel 102 defines an exhaust path, which is best shown by reference 802 in FIG. 8 as described in greater detail below. Exhaust from the gas turbine engine passes into the intake opening 104 and thereafter travels in the manner shown by the exhaust path 802.

The exhaust path 802 proceeds from the intake opening 104 and then through the exhaust flow channel 102, exiting at the exhaust opening 106 and continuing downstream from the exhaust opening 106. At least one conduit lies within the exhaust path 802 and makes multiple passes transverse to the exhaust path 802. Exemplary conduits are shown by reference 500 in FIG. 5, as explained in greater detail below. The conduits have an output that is coupled to a spray fixture 120. The spray fixture 120 divides liquid from the conduit into multiple streams and directs the streams into the exhaust path 802 for immediate evaporation.

The components described above may be fabricated from a variety of materials. One example uses a combination of sheet metal, square tube metal, and round tube metal. The components may be fastened with any or all of screws, rivets, bolts, welding, press fits, and the like. An exemplary metal is stainless steel.

More Details

Reference is made to FIGS. 1-6 and 8 to illustrate some additional features of the system 100. In one example, the exhaust flow channel 102 includes an intake column 112, intake transition 114, main body 108, exhaust transition 116, throat 110, and the spray fixture 120. The exhaust path 802 flows through all of these components. The intake column 112 connects with an output manifold of the gas turbine engine 1100 and may include an inverted cone 302 (FIG. 3) to help create or encourage laminar flow within the intake column 112 and reduce turbulence in the exhaust stream. The intake transition 114 provides a transition between the smaller cylindrical shape of the intake column 112 and the relatively larger box-like shape of the main body 108.

The main body 108 houses the conduits 500. The conduits 500 reside in the exhaust flow channel 102, and collectively provide a conduit path that makes repeated passes transvers to the exhaust path 802. As described below, the conduits are connected to various plenums 122/202, which are shown in FIG. 2 and described in greater detail below. For ease of reference, the components routing fluid from the entry port 204 to the exit port 206, and namely the conduits 500 and the port/starboard plenums 122/202, may be referred to collectively as a vessel. The vessel has an entry port 204 and an exit port 206 as illustrated by FIG. 2. In one example, the ports 204/206 are implemented by a valves such as 150 PSI NPT ball valves. These valves may be adjusted to control the flow into and out of the vessel.

This adjustment may be effected manually, such as by physically manipulating controls on the valve by hand or by using a computer or controller or digital or analog input or interface under manual human control to remotely manipulate an electrically driven relay or other remotely activated control integrated into or coupled to the valve. In contrast with manual control, one implementation provides for automatic computer managed adjustment of the valves, which occurs by remote control. The entrance and exit ports 204/206 may be implemented in many other ways, with some examples of equipment including quick connect attachments, threaded hose fittings, hose clamps, or any other equipment without limitation that is appropriate to the application at hand. The structure and operation of the vessel are explained in greater detail below.

In the illustrated example, there are various port-side and starboard-side plenums, which serve to collect and direct fluid flow through the conduits. This is explained in detail below. In one implementation, the port-side plenums are implemented by a cabinet that is welded-on to the port side of the main body 108, as shown by 122. Similarly, the starboard-side plenums may be implemented by a counterpart cabinet that is welded-on to the starboard side of the main body 108, as shown by 202. In this case, holes are drilled in the main body 108 walls to allow connection or through-passage of the individual items of conduit 501-528 to their respective plenums.

The exhaust transition 116 provides a transition between the larger box-like shape of the main body 108 and the rounded shape of the throat 110. The throat 110 may occupy multiple sections depending upon the details of fabrication, welding, and such.

The spray fixture 120 is attached to the throat 110 near the exhaust opening 106. The spray fixture 120 includes a dividing mechanism to divide fluid from the exit port 206 into multiple streams. The spray fixture 120 also includes an aiming mechanism to direct the multiple streams into the exhaust path 802.

The system 100 may include a support structure 118 such as legs, framework, and/or feet as appropriate to the weight and weight distribution of the system 100 as well as the anticipated surface where the system 100 will be used. In the illustrated example, when the system 100 is set upon the ground or other intended support surface (not shown), the exhaust path 802 in the main body 108 is generally horizontal with regard to the support surface and the exhaust path in the throat is angled upward with respect to the support surface.

Fluid Path

With continued reference to FIGS. 1-6, some equipment related to the fluid path in the system 100 are highlighted with additional reference to FIG. 8.

In the system 100, ambient temperature source water 806 comes from a pump 805. Unlike prior approaches that use a high pressure pump to vaporize wastewater, the pump 805 need not be a high pressure pump. The pump 805 may be implemented by any pump capable of providing a sufficient amount of water to the system 100 to provide the desired flow rate. The pump 805 may be electrically driven by a solar panel, small generator, vehicle battery, wind turbine, or other source of electrical power. In one example, the engine that generates the heated exhaust heat may be coupled to a small generator to provide local electrical power to components such as the pump 805.

The evaporation system 100 includes various conduits and plenums, which together serve to direct source water 806 through the exhaust path for preheating prior to evaporation. The primary component of the liquid in many applications will be water, although the water may also include solid and/or liquid contaminants. Heating is achieved by directing the liquid through a serpentine heating path 602 (FIG. 6) that lies within the exhaust path 802 while also traversing the exhaust path 802. The water in the heating path 602 may be referred to as a liquid, or more generally as a fluid to account for a possible condition where some liquid has undergone sufficient heating to vaporize.

The individual conduits may be referred to as pipes. As shown in FIG. 5, there is an array 500 including a multiplicity of pipes 501-528. In the illustrated example, there are four sets 532-535 of seven pipes. The sets 532-535 include pipes 501-507, 508-514, 515-521, and 522-528 respectively. As dictated by the intended application, intended engine, desired flow rate, and other considerations, there may be a greater or lesser number of pipes, sets of pipes, pipes in each set, etc.

The pipe sets are located at fixed, successively increasing distances along the exhaust path 802. The pipes 501-528 pass across the main body 108 of the exhaust flow channel 102, transverse to the exhaust path 802. Although there are many pipes, there is one shared entry port and shared one exit port. Namely, as best shown in FIG. 6, a starboard end of each pipe in the pipe set 535 is connected to a receiving plenum 608. The receiving plenum 608 receives liquid from the entry port 204, which in turn receives liquid from a hose 208 or pipe or other conveyance connected to a pump 805 which supplies water 806 to the system 100.

A port end of each pipe in the set 535 is connected to a redirecting plenum 609. The redirecting plenum 609 receives fluid exiting pipes 522-528 (set 535) and redirects that fluid into pipes 515-521 (set 534). Similarly, the redirecting plenum 610 receives fluid exiting the pipes 515-521 (set 534) and redirects that fluid into pipes 508-514 (set 533). Along these same lines, the redirecting plenum 611 receives fluid exiting pipes 508-514 (set 533) and redirects that fluid into pipes 501-507 (set 532).

The discharge plenum 612 receives fluid from pipes 501-507 (set 532) and discharges this fluid into the exit port 206. The exit port 206 is connected by hose 210 or conduit or other conveyance to the spray fixture 120. The hose 210 therefore carries preheated water 807 from the conduits to the spray fixture 120.

Thus, a continuous fluid path is provided from the pump 805 to the spray fixture 120 by the hose 208, entry port 204, receiving plenum 608, pipe set 535, redirecting plenum 609, pipe set 534, redirecting plenum 610, pipe set 533, redirecting plenum 611, pipe set 532, discharge plenum 612, exit port 206, hose 210, and spray fixture 120. And in this sense, the conduit 500 has a shared entry port (namely, entry port) and a shared exit port (namely, exit port 206).

In the illustrated example, there are multiple port-side redirecting plenums 611/609 and one starboard-side redirecting plenum 602. These numbers may be increased (or decreased) in order to provide greater (or lesser) fluid exposure to the exhaust path 802. For example, some applications may require greater heating or flow rate.

Spray Fixture

The spray fixture 120 receives fluid that is heated through the pipes and plenums and divides it into multiple streams and directs those streams into the exhaust path in order to rapidly evaporate the fluid. The spray fixture 120 comprises a hollow semi-torus. The semi-torus may exactly or approximately define a torus, and may provide a smooth or segmented or angular outer surface. For ease of construction, the semi-torus in one example may be comprise a polygonal shape, formed from multiple segments of tube that has a round or polygonal or other cross sectional shape. One example is an octagonal construction made from eight tube segments welded together.

In one example, the spray fixture 120 forms a "doughnut" shape as detailed in FIGS. 9-10. The illustrated semi-torus includes a wall 1000 that defines an internal volume 1002. The internal volume 1002 is coupled to the main body 108's exit port 206, in this example by way of the hose 210 and a spray fixture intake coupling 1004. The intake coupling 1004 may be implemented as a quick connect attachment, threaded hose fitting, hose clamp, ball valve or other valve, or any other equipment without limitation that is appropriate to the application at hand.

The wall 1000 of the spray fixture 120 has multiple apertures defined therein, as shown by 902. The apertures 902 are located at predetermined sites on the surface of the semi-torus. These sites are selected so as to pass pressurized fluid streams from the internal volume 1002 in predetermined directions outward of the spray fixture 120 and into the exhaust path 802.

The spray fixture 120 can be said to include a dividing mechanism and an aiming mechanism. The dividing mechanism comprises the structure whereby the apertures 902 split fluid from the volume 1002 into multiple streams such as 1012. The number of streams is determined by the number of apertures 902. In the illustrated example, the apertures 902 are distributed evenly in a continuous path along the spray fixture 120 surface. Other arrangements may be used instead, such as multiple rows or columns of apertures, uneven or clustered distribution, or any other arrangement that achieves sufficient fluid introduction and into the exhaust path and efficient consequent evaporation.

The aiming mechanism comprises one or both of site placement and angular orientation of the apertures 902 arranged so as to pass pressurized fluid streams 1012 from the internal volume 1002 into the exhaust path 802. In the illustrated example, the sites 902 are located on the inward slope 1010 of the semi-torus as best shown in FIG. 10. This imparts an upward component 1006 and an inward component 1008 to a fluid stream 1012 exiting the internal volume 1002 from the spray fixture 120, ensuring that each aperture 902's fluid stream 1012 passes into the exhaust path 802. In practice, the location of the apertures 902 on the circumference of the spray fixture 120 may be varied to change the trajectory of the fluid streams 1012 accordingly.

As an alternative to the internal volume and aperture approach depicted in FIGS. 9-10, a completely different type of spray fixture may be used. For example, the dividing mechanism may be implemented by a flow splitter or divider connected between the intake coupling 1004 and a plurality of tubes. In this example, the aiming mechanism is implemented by the orientation of the tube tips so as to direct each tube's stream of fluid into the exhaust path.

Other Features

The illustrated evaporation system 100 may include a number of further features. For example, the intake column 112 may include a vent line coupling 126 for attachment to a gearbox on an engine, in order to remove fumes and vapor from the engine gearbox. The system 100 may include one or more probes to measure temperature, pressure, flow, or other physical characteristics of internal fluid. For example, temperature probes 128 are shown mounted at the exhaust transition. Another feature is the safety fence 130. The fence 130 swings about the pivot 134 and, when lowered upon the spray fixture 120, places a screen 132 over the exhaust opening 106 in the spray fixture 120 in order to block discharge of large solid materials from the throat 110.

Operation

Having described the structural features of the present disclosure, the operational aspects of the disclosure will now be described. Without any intended limitation, the operational aspects are described and illustrated in the context of the structure from FIGS. 1-11.

Figure 12:
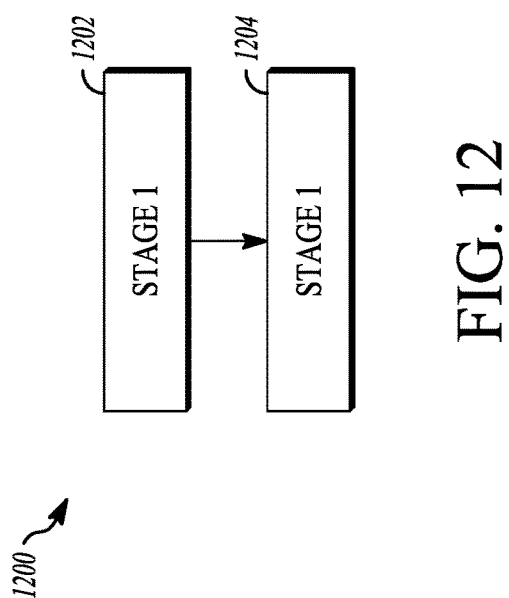
FIG. 12 is a flowchart illustrating a first operational sequence.

One operational aspect of the disclosure is a method of rapidly evaporating liquid, as illustrated in FIG. 12 by the operations 1200. In a first stage 1202, liquid to be evaporated is preheated. This occurs by running source liquid through one or more conduits laid out in a serpentine pattern within the exhaust stream. A second stage 1204 evaporates the fluid. This occurs by dividing fluid from the conduits into a plurality of streams and directing the streams into the exhaust stream.

Figure 13:
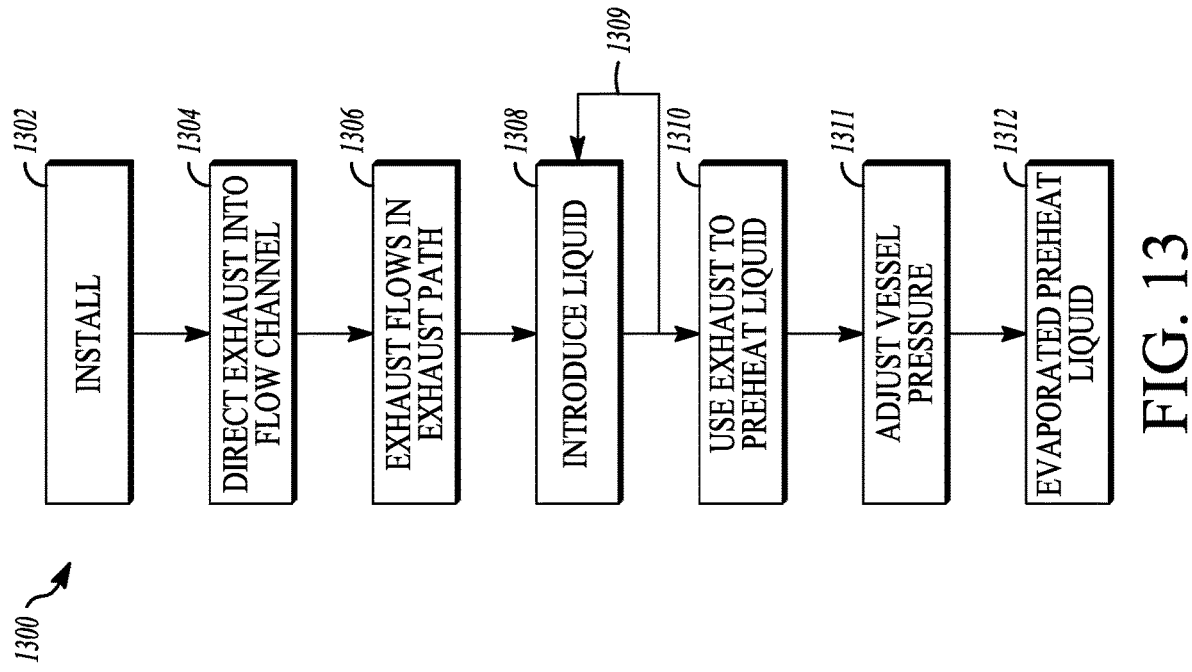
FIG. 13 is a flowchart illustrating a second operational sequence.

FIG. 13 illustrates a more detailed method of rapidly evaporating liquid, referencing the operations 1300. To provide a tangible example, but without any intended limitation, the operations 1300 are discussed in the context of wastewater evaporation. In step 1302, technicians install the evaporation system 100. This includes selecting an appropriate site for the system 100. Considerations include selecting a site with firm and level ground, proximity to a source of engine exhaust, proximity to the wastewater source, and proximity to an open area appropriate to discharge great amounts of water vapor. Installation 1302 also entails connecting the intake column 112 to the exhaust manifold of a gas turbine engine 1100. Although a gas turbine engine is used in this example, reciprocating engines that run on gasoline or natural gas or diesel may be used if they have sufficient exhaust temperature and flow to heat wastewater in the illustrated system. The engine 1100 in this example has its own support structure 1102, such as legs, framework, and feet as appropriate to the weight and weight distribution of the engine 1100 as well as the anticipated surface where the system 100 will be used. Optionally, the vent line coupling 126 may be attached to a gearbox (not shown) of the engine 1100 by an appropriate hose or other fluid conduit.

Step 1304 directs hot exhaust from the engine 1100 into the exhaust flow channel 102. In the present example, gas turbine exhaust has considerable volume and flow, and by its mere connection to the intake column 132, this forces the exhaust into the exhaust flow channel 102. FIG. 8 shows the hot exhaust 804 entering the intake column 112.

In step 1306, the exhaust flow channel 102 directs the hot exhaust 804 in an exhaust path 802 that proceeds from the intake opening 104 through the exhaust flow channel 102 and the exhaust opening 106 and continues downstream from the exhaust opening 106. The course of the exhaust path 802 is dictated by the size and shape and interconnection of the intake column 112, intake transition 114, main body 108, exhaust transition 116, throat 110, and spray fixture 120.

Step 1308 introduces wastewater into the system 100. This involves using the pump 805 to draw source water 806 from a pit or storage vessel or other site and apply pressure to move the source water 806 through the hose 208 and entry port 204 and thereafter the vessel. This step repeats continuously as shown by 1309 in order to keep the supply of water flowing to the machine 100.

Step 1310 uses the hot exhaust 804 to preheat the source water 806. Generally, this occurs by directing the source water 806 into the heating path 602, which makes repeated passes transverse to the exhaust path 802. The water 806, under the continued pressure from the pump, flows through the array 500 of pipes located in the exhaust path 802. The source water 802 is heated by exposing it to the heated exhaust 804 in the exhaust path 802, since the pipe array 500 resides within the exhaust path 802.

Specifically, water 806 takes the following course. The water 806 first enters the entry port 204 into the receiving plenum 608. From the receiving plenum 608, the pressurized water flows in the following order: into the set of pipes 535, then the redirecting plenum 609, then the set of pipes 534, then the redirecting plenum 610, then the set of pipes 533, then the redirecting plenum 611, then the set of pipes 532, then the discharge plenum 612.

In step 1311, the entry port 204 valve is varied to select the magnitude of fluid flow into the evaporator and thus help regulate pressure in the vessel. The exit port valve 206 is also controlled in step 1311 in order to expose water in the vessel to engine heat for a longer period of time and achieve greater heating. Both of the foregoing actions will increase the pressure in the vessel, so in this embodiment, these components are constructed appropriate to withstand the anticipated pressure.

By heating water to a greater temperature, the inventors discovered that the accelerated exhaust leaving the exhaust opening 106 will carry water particles higher into the atmosphere. The inventors also discovered and subsequently avoided the situation where water exiting the spray fixture 120 was just above the boiling point, causing droplets to rise in the atmosphere but, after they had condensed, to rain down soaking the area around the evaporator. The inventors found that at about 250-260 F the droplets exiting the spray fixture 120 were carried in the exhaust flow and did not condense as they did at the lower exit temperature. Therefore, by restricting the discharge by choking down the exit valve 206, step 1311 ensures that the temperature rises to a desired level. In a different embodiment, exit pressure could be restricted sufficiently to create super steam, which could be desirable for many purposes including driving a steam turbine, but may require sophisticated design changes to the pressure vessel.

In one embodiment, the valve control of step 1311 may be manually or automatically operated from a control room or other remote location by electronic signals transmitted to the valve. In one example, automatic controls are implemented to regulate the valves 204/206 to compensate for changes is ambient air temperature, engine power, and variations in the fluid weight of the product being evaporated. The valves may be controlled thru various methods such as electric motor, hydraulic motor, linear actuator to physically manipulate a ball valve handle, etc.

To aid in accurately regulating water temperature, the system 100 may include ore or more temperature sensors installed at appropriate sites to sample or approximate water temperature. For example, such sensors may be installed in or proximate the conduit 500, hose 210, spray fixture 120, plenums 122/202, conduit 500, etc.

After step 1311, step 1312 evaporates the preheated wastewater. In order for this to occur, the preheated water exits the main body 108 at the exit port 206, proceeds through the hose 210 to the spray fixture intake coupling 1004 and then into the spray fixture 120. The preheated water enters the internal volume 1002 of the spray fixture 120.

From there, the preheated wastewater is evaporated by dividing it into a plurality of streams and directing these streams into the exhaust path at or downstream of the exhaust opening 106. The multitude of apertures 902 serve to divide the preheated wastewater into streams, whereas the location and angle of the apertures 902 imparts desired angular components 1006/1008 to each stream 1012. The multitude of streams ensures substantial surface exposure of preheated water to exhaust heat and guarantees immediate evaporation, creating a vapor plume 808 as shown in FIG. 8. In an alternative embodiment, the spray fixture 120 may be mounted at an internal location of the throat 110 rather that at the throat's ultimate end.

The source water 806 is in liquid form when introduced into the main body 108. In some cases, some or all of the water might be heated into vapor within the vessel. This depends upon the temperature of the exhaust gas, rate of wastewater flow, number of pipes and pipe sets, and other considerations of architecture, design, physics, and implementation. Even if no water is vaporized in the path 602 through the main body 102, division and emission by the spray fixture 102 will have the effect of vaporizing the preheated liquid water.

Benefits & Advantages

The disclosed evaporation system provides a number of advantages. For one, the system has a high flow rate. In other words, the system can evaporate a large volume of water per minute. This is because the system uses the immense heat from a gas turbine engine exhaust stream to preheat and then vaporize the source water. For this same reason, evaporation is efficient and complete.

As a further advantage, the illustrated system avoids the need for a high pressure pump and its associated acquisition, maintenance, and operating expenses. This is achieved by utilizing a completely different principle of operation, which has been explained in detail. Thus, the current system 100 further avoids the acquisition cost, maintenance, and operating expenses of large diesel engines, which are often required to run high pressure pumps.

The illustrated system is also energy efficient because it uses the exhaust of a gas turbine engine, which is already on many well sites for operations such as hydraulic fracturing. Accordingly, little or no additional energy is needed to drive the apparatus 100. The only other energy required to drive the system 100 is the small amount of electrical power for the pump 805, which may be provided by grid power or by a small generator. The pump 805 may be driven without additional power, by using solar or wind generated electricity, or by using the gas turbine engine accessory housing to drive a generator or to drive the pump directly.

Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

This specification has been set forth with various headings and subheadings. These are included to enhance readability and ease the process of finding and referencing material in the specification. These heading and subheadings are not intended, and should not be used, to affect the interpretation of the claims or limit claim scope in any way.

The invention claimed is:

1. A system for rapidly evaporating liquid, comprising:
an elongated exhaust flow channel having an intake opening and an opposing exhaust opening, the channel defining an exhaust path proceeding from the intake opening through the exhaust flow channel and the exhaust opening and continuing downstream from the exhaust opening;
within the exhaust flow channel, at least one conduit forming a conduit path including repeated passes transverse to the exhaust path, the conduit connected to an entry port and an exit port; and
attached to the exhaust flow channel proximate the exhaust opening, a spray fixture including a dividing mechanism to divide fluid from the exit port into multiple streams and an aiming mechanism to direct the multiple streams into the exhaust path.

2. The system of claim 1, the spray fixture comprising a hollow semi-torus including a wall with an internal volume connected to the exit port, the wall having multiple apertures defined therein at predetermined surface points of the semi-torus, the predetermined surface points positioned so as to pass pressurized fluid streams from the internal volume in predetermined directions into the exhaust path.

3. The system of claim 1, the spray fixture comprising a hollow semi-torus comprising a wall with an internal volume connected to the exit port, the dividing mechanism comprising multiple apertures defined in the wall at predetermined surface points of the semi-torus, the aiming mechanism comprising one or both of site placement and angular orientation of the apertures established to pass pressurized fluid streams from the internal volume in predetermined directions into the exhaust path.

4. The system of claim 1, the dividing mechanism comprising a plenum or conduit junction providing fluid connection between the exit port and multiple pipes, and the aiming mechanism comprising tips of the multiple pipes angled to direct multiple streams of fluid from the conduit into the exhaust path.

5. The system of claim 1, the conduit comprising:
an array of multiple sets of pipes each of the sets located at successively increasing distances along the exhaust path and spanning the exhaust flow channel substantially transverse to the exhaust path;
a receiving plenum connecting the entry port to a first one of the sets of pipes;
a discharge plenum connecting the exit port to a final one of the sets of pipes; and
multiple redirecting plenums to redirect fluid sequentially from the first set of pipes to the final set of pipes.

6. The system of claim 1, further comprising an adjustable entry valve connected to or integrated into the entry port, and an adjustable exit port connected to or integrated into the exit port.

7. The system of claim 1, where the exhaust flow channel includes a main body, a support structure supporting the main body, and a narrowed throat coupled directly or indirectly to the main body and supporting the spray fixture; and under conditions where the support structure system rests upon a predetermined surface, the exhaust path in the main body is generally horizontal with regard to the surface and the exhaust path in the throat is angled upward with respect to the surface.

8. The system of claim 1, further comprising a gas turbine engine having its exhaust attached to the intake end.

9. An apparatus for rapidly evaporating liquid, comprising:
an exhaust flow channel having opposing openings including an upstream opening and a downstream opening, the channel defining an exhaust path proceeding from the upstream opening through the exhaust flow channel and through the downstream opening;
within the exhaust flow channel, a conduit path including repeated passes transverse to the exhaust path; and
attached to the exhaust flow channel proximate the downstream opening, a spray fixture coupled to an exit port of the conduit and including a divider to divide fluid from the exit port into multiple streams and an aimer to direct the multiple streams into the exhaust path.

10. A method of rapidly evaporating liquid, comprising operations of:
directing exhaust from an engine into an elongated exhaust flow channel having an intake opening and an opposing exhaust opening;
the exhaust flow channel directing the exhaust in an exhaust path proceeding from the intake opening through the exhaust flow channel and the exhaust opening and continuing downstream from the exhaust opening;
directing liquid into at least one conduit forming a conduit path including repeated passes transverse to the exhaust path, the conduit having an entry port and an exit port;
heating the liquid by exposing the liquid inside the conduit to exhaust in the exhaust path; and
directing heated fluid from the conduit to a spray fixture positioned near the exhaust flow channel proximate the exhaust opening, and the spray fixture dividing fluid from the exit port into multiple streams and aiming the multiple streams into the exhaust path.

11. The method of claim 10, the operations further comprising regulating pressure in the conduit by manipulating a valve at the exit port to restricting flow through the exit port.

12. The method of claim 10, where the fluid directed into the conduit path is in liquid form, the operations include converting the liquid into a vapor via one or more of the following operations: (a) the operation of directing fluid into the at least one conduit, (b) the operation of directing heated fluid to the spray fixture.

13. A method of rapidly evaporating liquid, comprising operations of:
directing exhaust from an engine into an elongated exhaust flow channel having an intake opening and an opposing exhaust opening;
the exhaust flow channel directing the exhaust in an exhaust path proceeding from the intake opening through the exhaust flow channel and the exhaust opening and continuing downstream from the exhaust opening;
heating liquid by passing the liquid through at least one conduit having a serpentine path transverse to and within the exhaust path;
evaporating the heated liquid by dividing the heated liquid from the conduit into a plurality of streams and directing the streams into the exhaust path at or downstream of the exhaust opening.

14. The method of claim 13, where the operation of heating liquid further comprises restricting liquid flow through the conduit to increase exposure time of the liquid to heat from the exhaust.

15. The method of claim 13, where the operation of heating liquid further includes automatically or manually narrowing a valve passage downstream of the conduit to constrict liquid flow in the conduit.

16. The method of claim 13, where the operation of heating liquid further includes regulating temperature of the liquid in the exhaust conduit, comprising constricting departure of liquid from the conduit until the liquid at a predetermined site in the exhaust flow channel reaches a predetermined temperature.

17. A method of rapidly evaporating liquid, comprising heating the liquid in two stages including a first stage of passing the liquid through one or more conduits passing in a serpentine pattern through an engine exhaust path within an enclosure and a second stage of dividing fluid output by the conduit into a plurality of streams and aiming the streams into the engine exhaust path at discharge sites positioned sufficiently near a downstream opening of the enclosure to vaporize fluid in the streams into an atmosphere external to the enclosure.

18. The method of claim 15, further comprising an operation of manually or automatically controlling fluid pressure in the conduits.

19. The system of claim 1, where:

the intake opening is positioned on an intake transition comprising a narrowed initial section of the elongated exhaust flow channel; and the intake transition includes a substantially cone-shaped flow guide with a base of the cone facing an upstream direction.

20. The system of claim 1, where:

the intake opening is positioned at a terminus of an intake transition comprising a narrowed initial section of the elongated exhaust flow channel; and the operations further comprise removing fumes and vapor from an engine gearbox by receiving them into elongated exhaust flow channel via an vent line coupling affixed to the intake transition.

* * * * *

UNITED STATES PATENT AND TRADEMARK OFFICE
CERTIFICATE OF CORRECTION

PATENT NO. : 10,955,130 B1  
APPLICATION NO. : 16/418260  
DATED : March 23, 2021  
INVENTOR(S) : McIntyre, II et al.

Page 1 of 1

It is certified that error appears in the above-identified patent and that said Letters Patent is hereby corrected as shown below:

In the Specification

In Column 3, under "TABLE 1-continued", Line 20, delete "512" and insert -- 612 --, therefor.

In Column 7, Line 14, delete "sites" and insert -- apertures --, therefor.

In Column 8, Line 12, delete "support" and insert -- engine support --, therefor.

In Column 8, Line 48, delete "802" and insert -- 806 --, therefor.

In Column 8, Line 48, delete "heated" and insert -- hot --, therefor.

In the Claims

In Column 12, Claim 13, Line 59, delete "path;" and insert -- path; and --, therefor.

In Column 14, Claim 20, Line 17, delete "an vent" and insert -- a vent --, therefor.

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*